US011997536B2

United States Patent
Gauvreau et al.

(10) Patent No.: US 11,997,536 B2
(45) Date of Patent: May 28, 2024

(54) SYSTEM AND METHOD FOR CONTROLLING CONGESTION IN A NETWORK

(71) Applicant: NOKIA SOLUTIONS AND NETWORKS OY, Espoo (FI)

(72) Inventors: Jean-Louis Gauvreau, La Prairie (CA); Angelo Cuffaro, Laval (CA); Rajinikanthan P, Chennai (IN); Dongdong Zhu, Bellevue, WA (US)

(73) Assignee: ALCATEL-LUCENT INDIA LIMITED, New Delhi (IN)

(*) Notice: Subject to any disclaimer, the term of this patent is extended or adjusted under 35 U.S.C. 154(b) by 67 days.

(21) Appl. No.: 17/684,110

(22) Filed: Mar. 1, 2022

(65) Prior Publication Data

US 2023/0284093 A1 Sep. 7, 2023

(51) Int. Cl.
*H04W 28/02* (2009.01)
*H04W 28/08* (2023.01)
*H04W 28/086* (2023.01)
*H04W 40/04* (2009.01)

(52) U.S. Cl.
CPC ... *H04W 28/0862* (2023.05); *H04W 28/0289* (2013.01); *H04W 28/0958* (2020.05); *H04W 40/04* (2013.01)

(58) Field of Classification Search
CPC ......... H04W 28/0289; H04W 28/0812; H04W 28/0835; H04W 28/0838; H04W 28/0862; H04W 28/0958; H04W 28/10; H04W 40/04; H04W 40/12
See application file for complete search history.

(56) References Cited

U.S. PATENT DOCUMENTS

| | | | | |
|---|---|---|---|---|
| 9,325,805 | B2* | 4/2016 | Shattil | H04L 45/70 |
| 10,200,267 | B2* | 2/2019 | Zafer | H04L 43/08 |
| 10,268,467 | B2* | 4/2019 | Ramanathan | H04L 41/0893 |
| 10,419,533 | B2* | 9/2019 | Shattil | H04L 67/1021 |
| 10,470,192 | B2* | 11/2019 | Fang | H04W 72/52 |
| 10,666,729 | B2* | 5/2020 | Tumuluru | H04L 43/103 |
| 2017/0273013 | A1 | 9/2017 | Edara | |
| 2017/0374602 | A1 | 12/2017 | Gokturk | |

(Continued)

FOREIGN PATENT DOCUMENTS

EP 3941106 A1 1/2022

OTHER PUBLICATIONS

Extended Search Report issued for EP Application No. 23159171.0 dated Jul. 26, 2023.

*Primary Examiner* — Alpus Hsu
(74) *Attorney, Agent, or Firm* — Kramer & Amado, PC.

(57) ABSTRACT

Various embodiments relate to a cloud controller configured to control a wireless network having an edge controller, including: a network interface configured to communicate with the wireless network; a memory; a processor coupled to the memory and the network interface, wherein the processor is further configured to: receive performance metrics for the wireless network including congestion information; compare the congestion information with congestion criteria; identify clients connected to the wireless network as candidates to be transferred; sending a steering command to the edge controller with a list of identified clients to steer; and receiving an indication of clients steered by the edge controller.

21 Claims, 7 Drawing Sheets

(56) References Cited

U.S. PATENT DOCUMENTS

| | | | |
|---|---|---|---|
| 2018/0089591 A1* | 3/2018 | Zeiler | G06F 3/048 |
| 2018/0324607 A1 | 11/2018 | Rengarajan | |
| 2020/0128067 A1* | 4/2020 | Guim Bernat | G06F 16/90339 |
| 2021/0049032 A1* | 2/2021 | White | H04L 67/12 |
| 2021/0105191 A1* | 4/2021 | Yang | G06F 11/3409 |
| 2021/0204011 A1* | 7/2021 | Jain | H04L 65/80 |

* cited by examiner

Scenario: Client connected to B1 moving towards B2

SYSTEM AND METHOD FOR CONTROLLING CONGESTION IN A NETWORK

Example embodiments disclosed herein relate to controlling congestion in a network.

BACKGROUND

Cloud controllers have been developed to control the operation of Wi-Fi networks with a large number of access points (APs). The Wi-Fi networks may be various Wi-Fi networks at various sites that are connected to a network provider. For example, the various sites may be home or businesses that deploy a Wi-Fi network including mesh networks. The cloud controller may implement radio resource management to assist in controlling the performance of the various networks.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a cloud controller configured to control a wireless network having an edge controller, including: a network interface configured to communicate with the wireless network; a memory; and a processor coupled to the memory and the network interface, wherein the processor is further configured to: receive performance metrics for the wireless network including congestion information; compare the congestion information with congestion criteria; identify clients connected to the wireless network as candidates to be transferred; send a steering command to the edge controller with a list of identified clients to steer; and receive an indication of clients steered by the edge controller.

Various embodiments are described, wherein the steering command includes load balancing between access points in the wireless network.

Various embodiments are described, further comprising monitoring congestion among radios in access points of the wireless network in the same frequency band and wherein the steering command includes load balancing between access points in the wireless network.

Various embodiments are described, wherein the steering command includes steering between a first radio using a first frequency band and a second radio using a second frequency band when there is congestion in the first frequency band.

Various embodiments are described, wherein the steering command includes a non-preferred radio list.

Various embodiments are described, wherein the non-preferred radio list is ordered based upon a congestion level.

Various embodiments are described, wherein the non-preferred radio list includes a time to live indication.

Various embodiments are described, wherein the congestion criteria include one of an overall congestion level of a radio, an own channel usage of a radio, and a number of associated devices.

Various embodiments are described, wherein identifying clients connected to the wireless network as candidates to be transferred further is based upon one of the clients being dual band capable, steering attempt success rate, a ranking of clients current usage throughput rates, and a limit on the number of clients that may be steered using one steering command.

Various embodiments are described, wherein the steering command is sent to the edge controller using one of a RESTFULL HTTP interface and a MQTT interface.

Various embodiments are described, wherein the steering command is sent to the edge controller using extensions to the User Services Platform (USP) data model.

Further various embodiments relate to an edge controller configured to control a wireless network based upon steering commands from a cloud controller, including: a network interface configured to communicate with the cloud controller; a memory; and a processor coupled to the memory and the network interface, wherein the processor is further configured to: receive a steering command from the edge controller with a list of identified clients to steer; determine for each identified client to steer a new radio; send a client steering command to each of the clients; and send, to the cloud controller, an indication of clients steered by the edge controller.

Various embodiments are described, wherein the processor is further configured to transmit performance metrics for the wireless network including congestion information to the cloud controller.

Various embodiments are described, wherein the steering command includes load balancing between access points in the wireless network.

Various embodiments are described, wherein the steering command includes steering between a first radio using a first frequency band and a second radio using a second frequency band when there is congestion in the first frequency band.

Various embodiments are described, wherein the steering command includes a non-preferred radio list.

Various embodiments are described, wherein the non-preferred radio list is ordered based upon a congestion level.

Various embodiments are described, wherein the non-preferred radio list includes a valid time value associated with at least one radio in the non-preferred radio list and wherein the processor is configured to remove the radio associated with the valid time value from the non-preferred radio list when the valid time expires.

Various embodiments are described, wherein determining for each identified client to steer a new radio includes determining optimal new radios for each identified client based upon a path cost algorithm.

Various embodiments are described, wherein the new radio is a radio with a lowest path cost.

Various embodiments are described, wherein the new radio is a radio with a lowest path cost not on a non-preferred radio list.

Various embodiments are described, wherein the steering command is sent to the edge controller using one of a RESTFULL HTTP interface and a MQTT interface.

Various embodiments are described, wherein the steering command is sent to the edge controller using extensions to the User Services Platform (USP) data model.

Further various embodiments relate to a method of controlling an edge controller configured to control a wireless network based upon steering commands from a cloud controller, including: receiving a steering command from the edge controller with a list of identified clients to steer; determining for each identified client to steer a new radio; sending a client steering command to each of the clients; and sending, to the cloud controller, an indication of clients steered by the edge controller.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

To facilitate understanding, identical reference numerals have been used to designate elements having substantially the same or similar structure and/or substantially the same or similar function.

DETAILED DESCRIPTION

Figure 1:
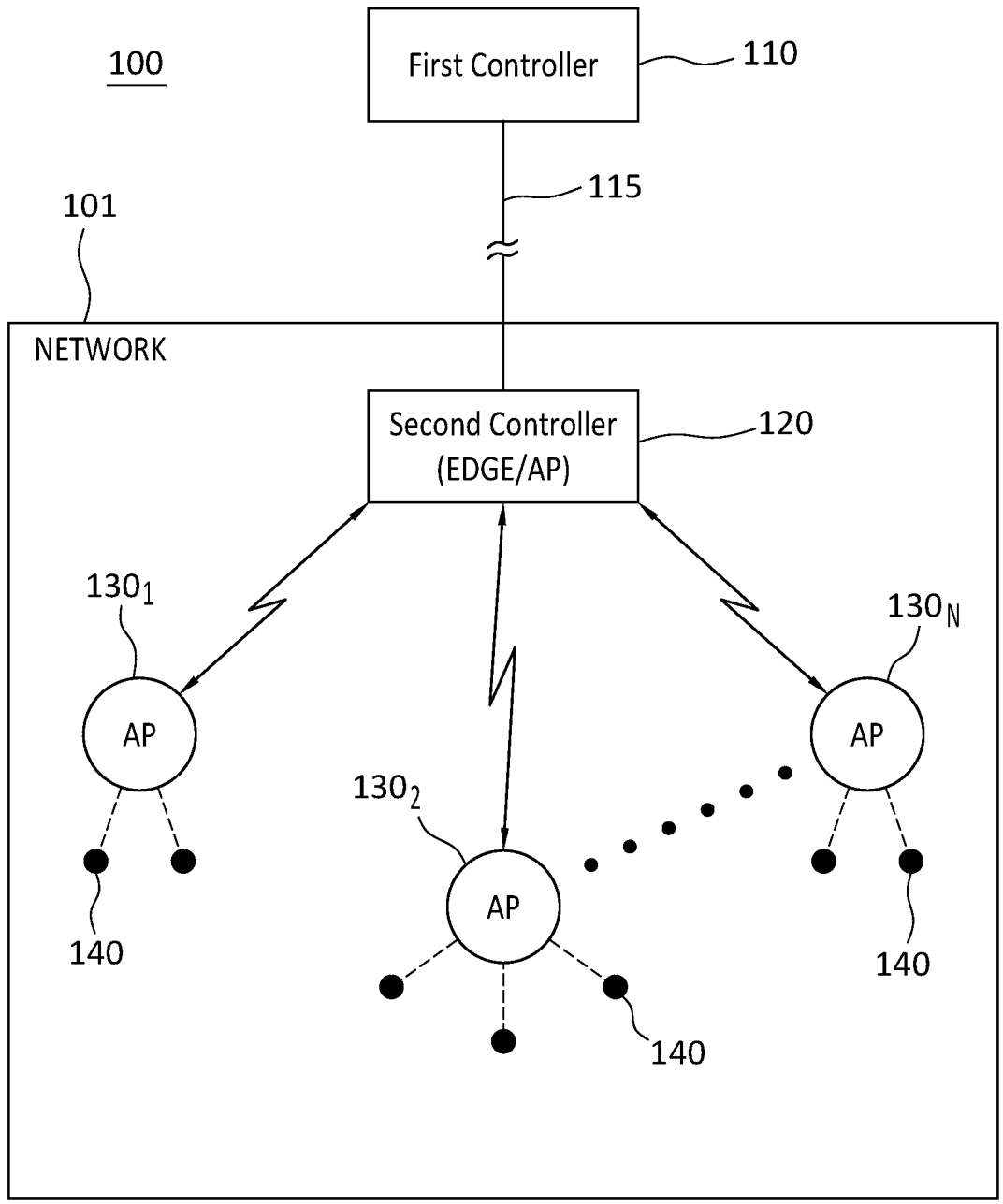
FIG. 1 illustrates an embodiment of a system for controlling congestion in a communications network.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

FIG. 1 illustrates an embodiment of a system 100 for controlling congestion in a communications network 101. The network may be located in a home, business or other location and may be allocated to satisfy the communication needs of multiple client devices. Because the clients are using the network at the same time, instances of congestion may develop where, for example, one radio channel may approach saturation. In such a case, the network may not be able to provide efficient service for one or more of the client devices. To prevent service degradation from occurring, the system controls congestion in the network to perform a reallocation resources in a way that will maintain service performance, all in a manner transparent to the users of the client devices.

Referring to FIG. 1, the system 100 may include a first controller 110 which communicates with a second controller 120, the latter of which is located within the network. The first controller 110 may, for example, be located at a remote location relative to the network. In one embodiment, the first controller may be located in another network to which network 101 is coupled. The other network may be a cloud network, a virtual private network, or another type of network. For purposes of illustration, the other network will be discussed as a cloud network and for this reason the first controller 110 may be referred to as a cloud controller. The cloud network may be any cloud computing publicly or privately hosted entity which is used to compute and store information received by one or more Access Points (APs), and in some embodiments compute and configure a set of multiple APs.

The second controller 120 may serve as an interface controller between the first controller 110 and the various elements in the network 101. For example, all communications that take place between the elements in network 101 and the first controller may pass through the second controller 120. In such a case, the second controller may be or be included in a gateway, modem, router, access point, or another type of network element. When the network 101 is a mesh-type network, the second controller may be an edge controller. However, the second controller is not intended to be limited in this manner, e.g., the second controller may perform management and communication operations respecting the elements in other types of networks different from mesh networks.

In one embodiment, the second controller 120 may be the only element in network 101, except for a plurality of client devices. In another embodiment, the second controller may communicate with one or more access points within the network. In this case, the second controller 120 may itself serve as an access point. In FIG. 1, the example is shown where the second controller is an edge controller 120 within a gateway that serves as an access point that communicates with one or more other access points (AP) 130$_1$ to 130$_N$. In this scenario, each access point (including the second controller 120) may wirelessly communicate with one or more client devices 140. The access points may communicate with the client devices based on one or more communication protocols, e.g., Wi-Fi. In a Wi-Fi application, the client devices may move from one access point to another in the network seamlessly and transparently without disruption of service. As a gateway, the second controller 120 may communicate with the first controller 110, for example, through the internet 115.

Figure 2:
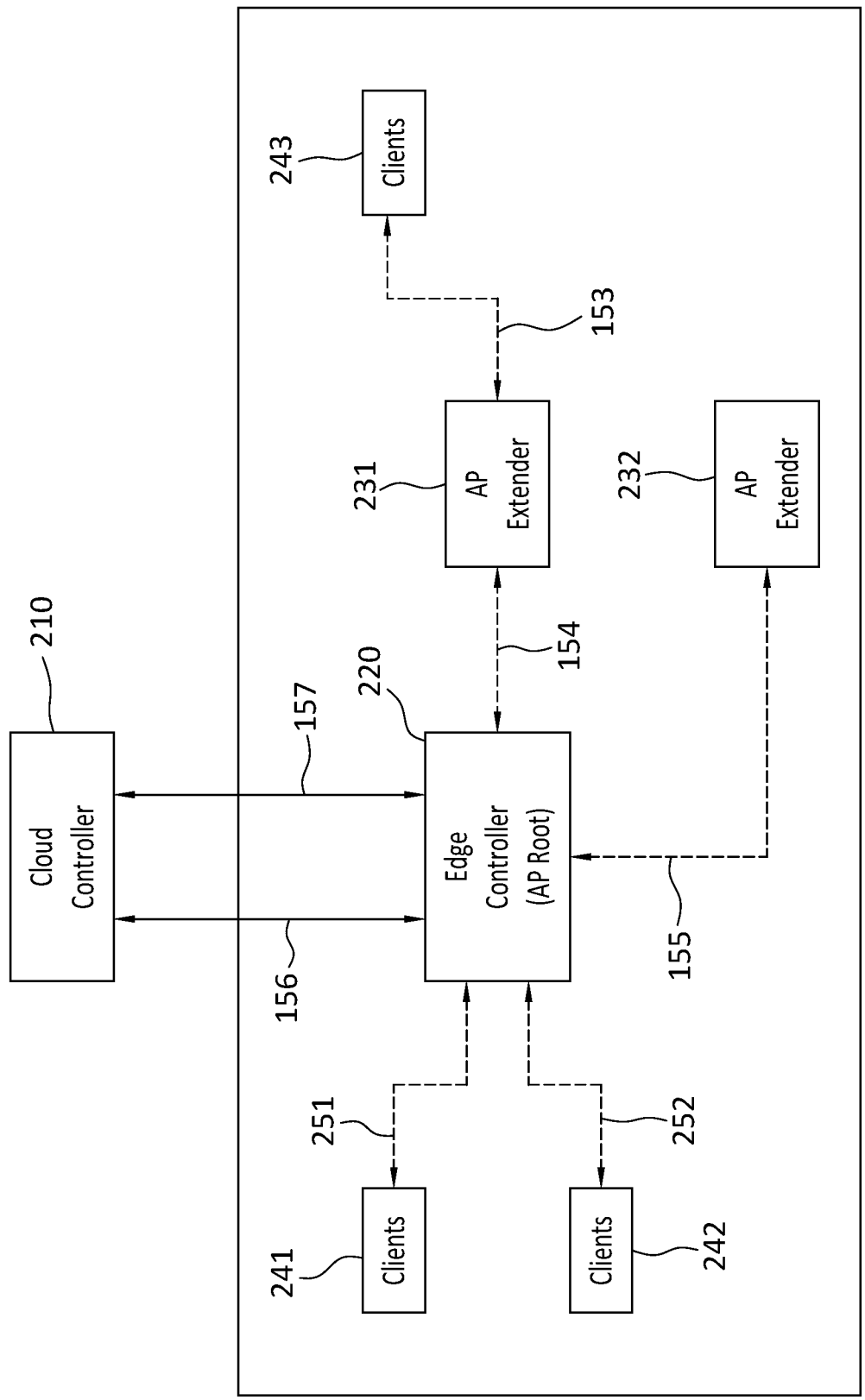
FIG. 2 illustrates one example implementation of the system applied to a Wi-Fi application of the network.

FIG. 2 illustrates one example implementation of the system applied to a Wi-Fi application of the network 101. In this implementation, the first controller is a cloud controller 210 and the second controller is an edge controller 220 which is included in the root access point in the network. Certain functionalities (e.g., coordinating client steering commands or channel change commands) involving all APs across all the mesh network may be performed in the AP root.

In addition to these elements, the system includes two additional access points referred to as AP extenders 231 and 232 which communicate with the root access point using, for example, a mesh standard. The edge controller 220 in the AP root communicates with client devices 241 and 242 over corresponding Wi-Fi links 251 and 252 within its range of service. Each of the AP extenders may also communicate with their own client devices over separate links (e.g., in the example shown client 243 communications with AP extender 231 over Wi-Fi link 153), and each of the AP extenders communicate with the AP root 220 over Wi-Fi links 154 and 155, respectively.

In operation, each AP may periodically send performance metrics 156 to the cloud controller. These metrics may be processed to determine network performance and stored. This stored performance data may then be used to help make steering decisions as described below. The metrics may correspond to the performance of one or more internal radios and the client devices that each AP is providing with network service. In addition, configuration data 157 may be exchanged between the APs and the cloud controller through, for example, a polling/polling response mechanism using an HTTP restful interface or a MQTT interface. Other types of interfaces may be used as well. The configuration data may be updated based upon the network performance. In one embodiment, the APs may be Wi-Fi Access Points or Wi-Fi routers which, for example, can support 802.11a/b/n/ac/ax interfaces. The client device may support one or more of the Wi-Fi 802.11a/b/n/ac/ax interfaces and are associated with one of the APs controlled by the cloud controller, through operation of the edge controller.

While a multiple-AP configuration is shown in FIG. 2, in another embodiment may encompass a single-AP configuration where the single AP includes the edge controller servicing all client devices in the network.

In one embodiment, each of the access points (including the access point which includes the edge controller) may include multiple radios that support communications between the cloud and the client devices. For example, each access point may include a first radio (or radio channel) that supports communications in a first band and a second radio (or radio channel) that supports communications in a second band. As an example, a third band may be included. For example, the first band may be 2.4 GHz, the second band may be 5 GHz, and the third band 6 GHz.

Thus, within this arrangement, the edge controller 220 may assist in managing network resources by generating control signals to change the band on which at least one client device of at least one access point is communicating when that access point becomes congested. The edge controller 220 may perform this change in cooperation with the cloud controller 210, and it is suitable to do so because communications between the client devices and the cloud may occur bidirectionally through the access point of the edge controller 220. The client devices may be, for example, smart phones, tablets, computers, streaming media boxes, televisions, and/or any other network-connectable device equipped with a Wi-Fi interface.

Figure 3:
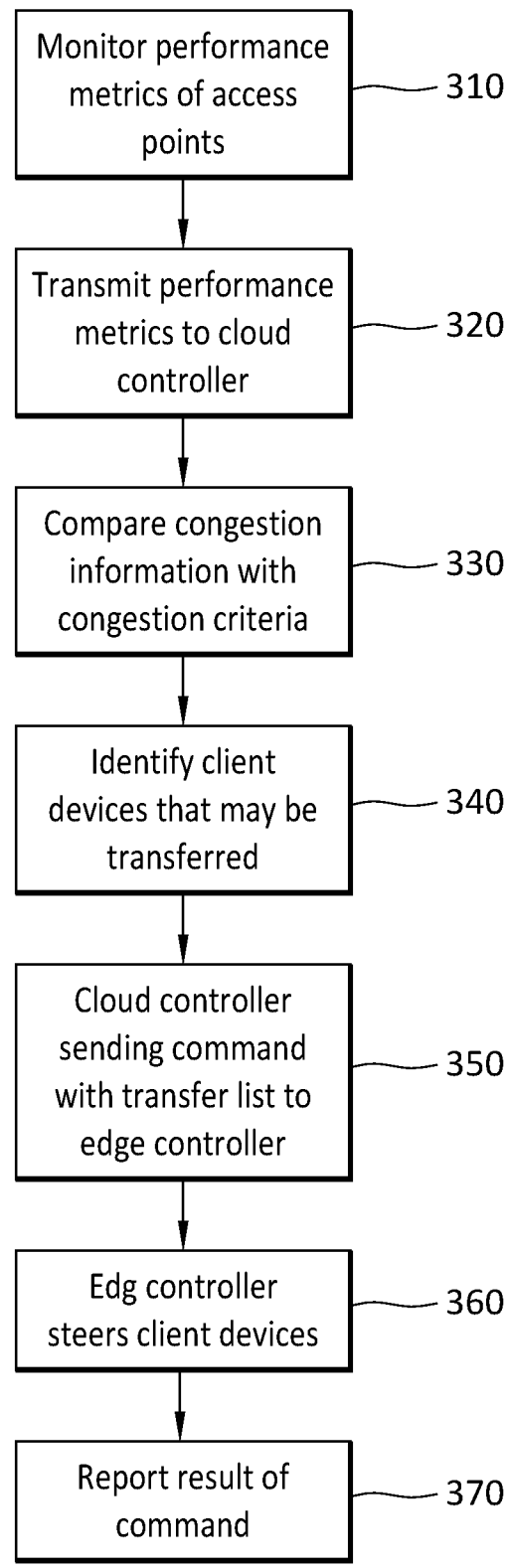
FIG. 3 illustrates an embodiment of a method which may be implemented to control a network, including but not limited to the network of FIG. 1 or 2.

FIG. 3 illustrates an embodiment of a method which may be implemented to control a network, including but not limited to the network of FIG. 1 or 2. The method may be performed by one or more of the first (cloud) controller and the second (edge) controller. In operation, the first controller and second controller cooperate to manage congestion within the network 101 using the method. This may be accomplished by re-allocating one or more network resources among the access points and/or client devices.

In this method, some of the operations may be performed by the first controller and other operations of the method may be performed by the second controller. The method of FIG. 3, thus, includes a combination of operations performed by the controllers. However, it is understood that the operations performed by the first controller may constitute one embodiment of one method of controlling a network, and the operations performed by the second controller may constitute another embodiment of a method for controlling a network. For explanatory purposes, the first controller will be referred to as a cloud controller and the second controller will be referred to as an edge controller or access point.

The change in allocation of resources may be performed in various ways. The first way involves moving one or more client devices from a congested band of an access point to another band of the same access point. The second way involves moving one or more client devices from a congested radio of one access point to another access point. Embodiments of methods for performing these types of congestion management are described below.

Congested Band Steering within a Same Access Point

One type of congestion management involves performing a congested band-steering method within the same access point. This method includes determining that a certain band in a multi-band access point is congested, and then controlling one or more client devices operating on that band to change to another, less-congested operating band of the same access point. Embodiments of this method are described below.

Referring to FIGS. 1, 2 and 3, the method may include, at 310, the edge controller 220 monitors its own performance metrics and receives performance metrics of the other access points. In the case where the edge controller does not also serve as an access point, controller 220 may receive performance metrics of only the access points. Monitoring and receiving these metrics may occur continuously, periodically, or in accordance with a predetermined polling schedule or in response to polling commands. Alternatively or additionally, operation 310 may be performed on an event-driven basis. When a polling scheme is used, the edge controller 220 may poll the other access points to receive their performance metrics. The polling may be performed by the edge controller 220 independently from the cloud controller 210 and/or may be performed by the edge controller 220 in response to a polling command from the cloud controller 210.

The performance metrics may include those which, for example, may be used as a basis for determining the amount of congestion each access point is experiencing and also the overall congestion in the network. Examples of the performance metrics include, but are not limited to received signal strength indicator (RSSI), Phy Rates (transmit rate/receive rate), bandwidth, number of streams, guard interval, noise floor, Own Channel Medium Usage, per STA throughput, per STA TX bytes, per STA Rx bytes, per STA Airtime usage, etc.

At 320, the edge controller 220 transmits the performance metrics to the cloud controller 210. The cloud controller 220 may then convert these metrics into information indicative of congestion level at the various access points. In one embodiment, this conversion need not be performed when the metrics themselves directly provide an indication of congestion level. In this case, the performance metrics may themselves be the congestion level information. Through these operations, the cloud controller may dynamically (e.g., and periodically) monitor the overall congestion level in the network, the congestion level at each access point (taking all bands and radio of that access point into consideration), and the congestion level of each radio and operating band of each access point in the network. In one example, each access point may communicate information on two bands: the 2.4 GHz band and the 5 GHz. Once the performance metrics have been received, the edge controller may transmit these metrics independently from the cloud controller or in response to a control signal (e.g., polling command) from the cloud controller.

At 330, the cloud controller 210 may compare the congestion level information transmitted in operation 320 with predetermined congestion criteria. In one embodiment, the cloud controller may compare the congestion level of each Wi-Fi radio in each access point based on at least one one of the following criteria.

The first criteria is that the overall congestion level of a band of a radio of an access point is greater than an overall congestion level threshold.

The second criteria is that the own channel (or band) usage of a radio (this is typically referred as the IBSS, i.e., traffic generated within the BSS as opposed to traffic generated from devices Outside the BSS-OBSS) of the access point is greater than an own channel usage threshold. This criteria may ensure that a large portion of the overall congestion in the network is caused by internal traffic generated by the serving radio. In such a case, one or more of the client devices may be moved to one operating band to another operating band of the same access point.

The third criteria is that the number of client devices associated with the band of a radio of the access point, or the total number of client devices associated with all radios of the access point, is greater or equal to a predetermined minimum number of stations. This criteria may allow for a band-to-band transfer of one or more client devices being served by the access point when the total number of stations associated with the congested band is significant.

At 340, when at least one of the congestion criteria is satisfied for a given band, the cloud controller may identify one or more suitable client devices that may be transferred within the network. Which of the client devices are deemed suitable may be determined based on congestion policies sent to the cloud controller 210 by a central management system using, for example, a northbound application programming interface (API). The congestion policies may be one or more of the following.

The first policy includes that the client device should be dual-band or multi-band capable. This may be determined, for example, based on the mode (high throughput (HT), Very High Throughput (VHT), High Efficiency (HE), or Extremely High Throughput (EHT)) reported by the access point concerning the specific client device or by observing the client device operating in multiple bands (e.g., in both the 2.4 GHz band and the 5 GHz band). Policies can also be based on the capabilities of the client device. The 802.11h protocol if supported by the client can be used by the edge controller to minimize the interruption time when steering the client from one band to another.

The second policy relates to the historical behavior of previous steering attempts of the client device and the corresponding success rate. For example, a given client device with a very low success rate of client steering (e.g., below a predetermined rate) may be temporarily considered as unsuitable for a specified duration. The duration can depend on the success rate percentage. For example, a success rate <20%, would incur a duration of 24 hours. Success rate <40% would incur a duration of 60 minutes, etc.

The third policy includes that only client devices currently consuming a significant (e.g., predetermined) portion of the throughput in the band of the access point being used is to be considered for suitability. For example, the cloud controller may rank the client devices of the access point based on current usage or throughput and only consider the one or more client devices ranked the highest for client steering.

Using one or more of the aforementioned congestion policies, the cloud controller 210 may determine which client devices operating on one band of an access point are considered suitable candidates for transfer to another operating band of the same access point, and which client devices are unsuitable for this purpose. In one embodiment, the cloud controller 210 may limit the number of suitable clients it can decide to steer in one cycle. The upper limit can be configured.

At 350, the cloud controller 210 may send a command to the edge controller 220 indicating which client device(s) determined to be suitable for transfer should be steered for the access point. The network 101 may be a mesh-type network such as, but not limited to, EasyMesh. As an example, the command may include the following structure and information:

--- congestionConfig: defines congestion based band steering
cbbsEnabled: 0,1: if congestion based band steering is enabled than =1
vap_interface: defines the AP, bssid and clients to be steered
apPrimMac: AP primary mac under which the client will be steered. The Primary Mac is used as a unique identifier for the Access Point. The Primary MAC is typically the MAC address of the primary LAN Bridge.
bssid: Bssid under which the client will be steered
sta: List of mac clients to be steered

---

Using all or a portion of the aforementioned policies, the cloud controller 210 may select one or more client devices served by the congested operating band of a radio of the access point for steering to another operating band of the same radio of the same access point. As a protection, if for the same congested radio, a band (or channel) change was triggered, the client device steered may be skipped and its information may not be sent to the edge controller 220 of the root AP, in order to avoid steering a client device served by a radio that is expected to change channel at the same time.

At 360, the edge controller 220 selects another radio of the access point the client device(s) should be steered to in the mesh, and then sends a command to those client device (s) through the access point. In this embodiment, the other radio may be a different operating band from the one the client device(s) is/are currently using of the same access point. For example, if the 2.4 GHz band of the access point is determined to be congested, one or more of the selected client devices may be signaled to change to the 5 GHz band of the access point. Once the command is received by the client device, the client device may switch to the new band in accordance with the command, thereby reducing congestion and improving network performance for that access point and its associated client devices and for the network overall. The command provided to each selected client device may be sent, for example, using 802.11v signaling provided the client device supports the 802.11v BTM feature. Otherwise, signaling may be performed using a Deassociation/Deauthentication method.

At 370, once the command has been transmitted to the client device(s) by the edge controller 220, the edge controller 220 may send a reporting message to the cloud controller indicating that the client steering command was successfully sent to and performed by the client. For example, the reporting message may include a field indicating that the "congested band steering" operation was performed.

The reporting message may be sent and structured in various ways. For example, the edge controller 220 may send the reporting message to the cloud controller 210 using a Northbound API message. The message may be sent in JSON format or another format or protocol may be used to send the message. Upon receiving the reporting message, the cloud controller may (e.g., once or periodically) verify the state and location of the steered client device to confirm whether this device has been successfully steered away from the congested radio band of the access point. For each verification, the edge controller may send a corresponding message to the cloud controller to report the results.

Congested Radio Steering Between Access Points

Another type of congestion management involves performing a congested radio-steering method between different access points. This method includes determining that a certain radio in one multi-band access point is congested, and then controlling one or more client devices operating on that radio to change to a less-congested radio of another access point in the network. This change may involve switching the one or more devices to the same operating band and/or a different operating band of the radio in the other access point. Embodiments of this method are described below.

Figure 4:
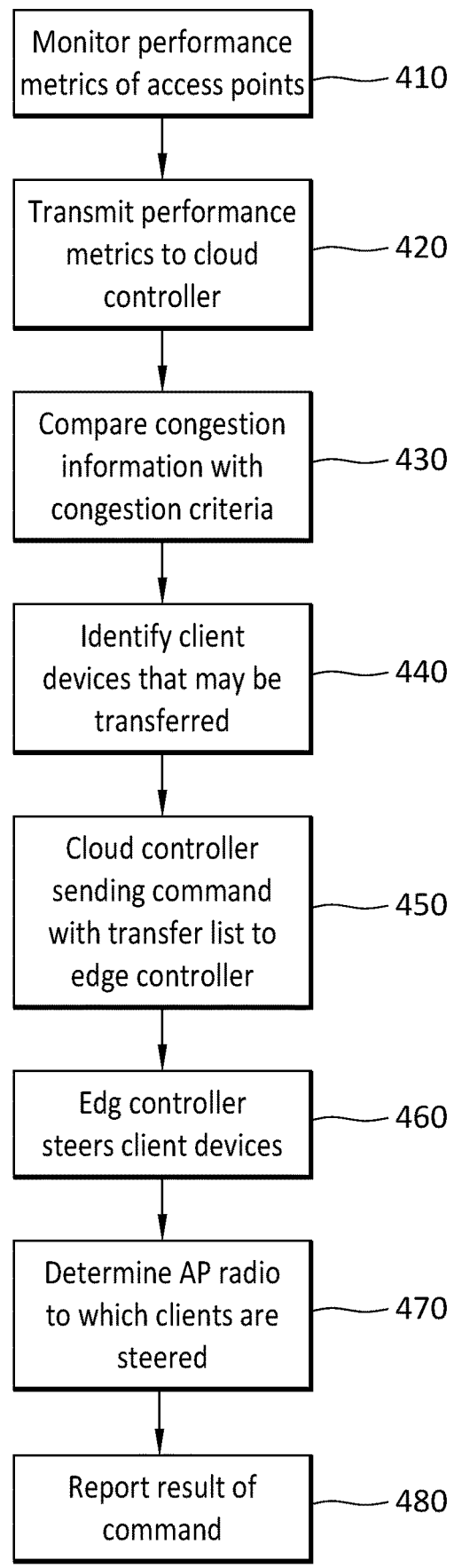
FIG. 4 illustrates an embodiment of a method which may be implemented to control a network, including but not limited to the network of FIG. 1 or 2.

FIG. 4 illustrates an embodiment of a method which may be implemented to control a network, including but not limited to the network of FIG. 1 or 2. Referring to FIGS. 1, 2 and 4, the method may include, at 410, the edge controller 220 monitors its performance metrics or its own radio(s) and receives performance metrics of the radios of the other access points in the network. As previously indicated, the edge controller may be located in the root access point 220 of the network. Monitoring of these performance metrics may be performed in a manner analogous to the monitoring performed in operation 310.

At 420, the edge controller 220 transmits the performance metrics to the cloud controller 210. The cloud controller may then convert these metrics into information indicative of congestion level or the metrics may themselves provide an indication of congestion level, in which case no conversion may be performed. Through these operations, the cloud controller 210 may dynamically (e.g., and periodically) monitor the overall congestion level in the network, the congestion level at each access point (taking all radios and their associated bands into consideration), and the congestion level of the radio of each access point in the network. In accordance with one or more embodiments, it is understood that a radio of an access point may refer to the logic or circuit in an access point which supports communications along one operating band or along multiple operating bands, e.g., the radio may be a single-band radio or a multi-band radio. The embodiments described herein cover all of these cases. Once the performance metrics have been received, the edge controller 220 may transmit these metrics independently from the cloud controller or in response to a control signal (e.g., polling command) from the cloud controller.

At 430, the cloud controller 210 may compare the congestion level information transmitted in operation 420 with predetermined congestion criteria. In one embodiment, the cloud controller may compare the congestion level of each Wi-Fi radio in each access point based on at least one of the following congestion criteria.

The first criteria is that the overall congestion level of the radio (across one or more of its associated bands) of an access point is greater than an overall congestion level threshold.

The second criteria is that the own channel usage of the radio (e.g., IBSS) is greater than an own channel usage threshold. This criteria may ensure that a large portion of the overall congestion in the network caused by internal traffic generated by the serving radio. In such a case, the steering operation may include moving one or more client devices to a radio of at least one other access point.

The third criteria is that the number of client devices associated with a radio of the access point, or the total number of client devices associated with all radios of the access point, is greater or equal to a predetermined minimum number of stations. This criteria may allow for a transfer of one or more client devices to another access point when the total number of stations associated with the congested radio is significant, e.g., exceeds the predetermined minimum.

At 440, when at least one of the congestion criteria is satisfied for a given band, the cloud controller may identify one or more suitable client devices for transfer (e.g., to be steered) within the network. Which client device(s) is/are deemed suitable for transfer may be determined based on congestion policies accessed by the cloud controller. The congestion policies may be one or more of the following, which may be similar to those previously described for band-to-band steering.

The first policy includes for the client device to be dual-band capable, e.g., as determined based on the specific Wi-Fi mode (i.e., HT, VHT, HE, EHT, etc.) reported by its associated access point or by cloud controller determining (e.g., based on the uploaded metrics) the client device operating in multiple bands.

The second policy relates to the historical behavior of the client device based on previous steering attempts and their associated success rates. For example, as indicated for band-to-band steering, this may involve assigning a client device with a very low success rate (e.g., below a predetermined rate) into what is effectively a penalty box, e.g., setting a flag indicating that the client device has a non-eligible status for steering at least for a certain period of time. For example, a given client device with a very low success rate of client steering (e.g., below a predetermined rate) may be temporarily considered as unsuitable for a specified duration. The duration can depend on the success rate percentage. For example, a success rate <20%, would incur a duration of 24 hours. Success rate <40% would incur a duration of 60 minutes, etc.

The third policy relates to the amount of throughput for a client device. For example, suitable clients eligible for steering may include ones that are currently consuming a predetermined percentage or more of the throughput of its associated access point. In this case, the cloud controller may rank the client devices of each access point based on current usage or throughput and only label the one or more highest client devices as ones suitable for steering.

The fourth policy may place a limitation on the number of client devices to be steered in any one cycle. Thus, for example, if the upper limit of client devices that can be steered in any one cycle is two, than a maximum of any two client devices of a radio of an access point may be steered to the radio of another access point in order reduce congestion.

Using all or a portion of the aforementioned policies, the cloud controller may select one or more client devices served by a radio of one access point for steering to a radio of at least one other access point. As a protection, if a channel change was triggered for the same congested radio, the client device steered may be skipped and its information may not be sent to the edge controller 220 of the root AP, in order to avoid steering a client device served by a radio that is expected to change channel at the same time.

At 450, the cloud controller 210 may send a command to the edge controller 220 indicating which client device(s) determined to be suitable for transfer should be steered for the access point. As previously indicated, network 101 may be a mesh-type network, e.g., EasyMesh. As an example, the command may include the following structure and information:

```
lb5gConfig: defines 5G Load Balancing configuration
lb5gEnabled: 0,1: if 5g load balancing is enabled than =1
vap_interface: defines the AP, bssid and clients to be steered
apPrimMac: AP primary mac under which the client will be steered
bssid: Bssid under which the client will be steered
sta: List of clients mac to be steered
```

In one embodiment, once all the congested radios of APs belonging to an EasyMesh have been identified and all the suitable clients currently operating under the congested radios, have also been identified, the cloud controller may send a message as indicated above to the edge controller of the root AP. The message may be sent in JSON or another format or protocol.

At 460, the edge controller 220 will select which of the suitable client devices determined in operation 450 should be steered from the radio of their associated access point. This may be all of the client devices that were deemed to be suitable by the cloud controller or less than all of the client devices deemed suitable.

At 470, edge controller 220 determines the radio(s) of at least one other access point to which the client device(s), selected in operation 460, are to be steered, e.g., reallocated to. Once determined, the edge controller may then send corresponding command(s) to the client device(s) that are to be steered. Each command may be sent to one of these client devices using, for example, 802.11v signaling, if the client device supports the 802.11v BTM feature. Otherwise, the command may be sent using a different method, e.g., Deassociation/Deauthentication.

At 480, the edge controller generates a reporting message for transmission to the cloud controller. The reporting message may indicate that the client steering command was successfully sent to the client device. The reporting message may also include a field indicating the reason for which the steering command was sent. For example, when the radio of the serving AP operates in the 5 GHz band and the radio of the new serving AP (to which the client device was steered) also operates on the 5 GHz band, the reason field of the reporting message may indicate "5 GHz load balancing." In another embodiment, the radio of the new serving AP may be operating on another band, e.g., 2.4 GHz band.

Figure 5:
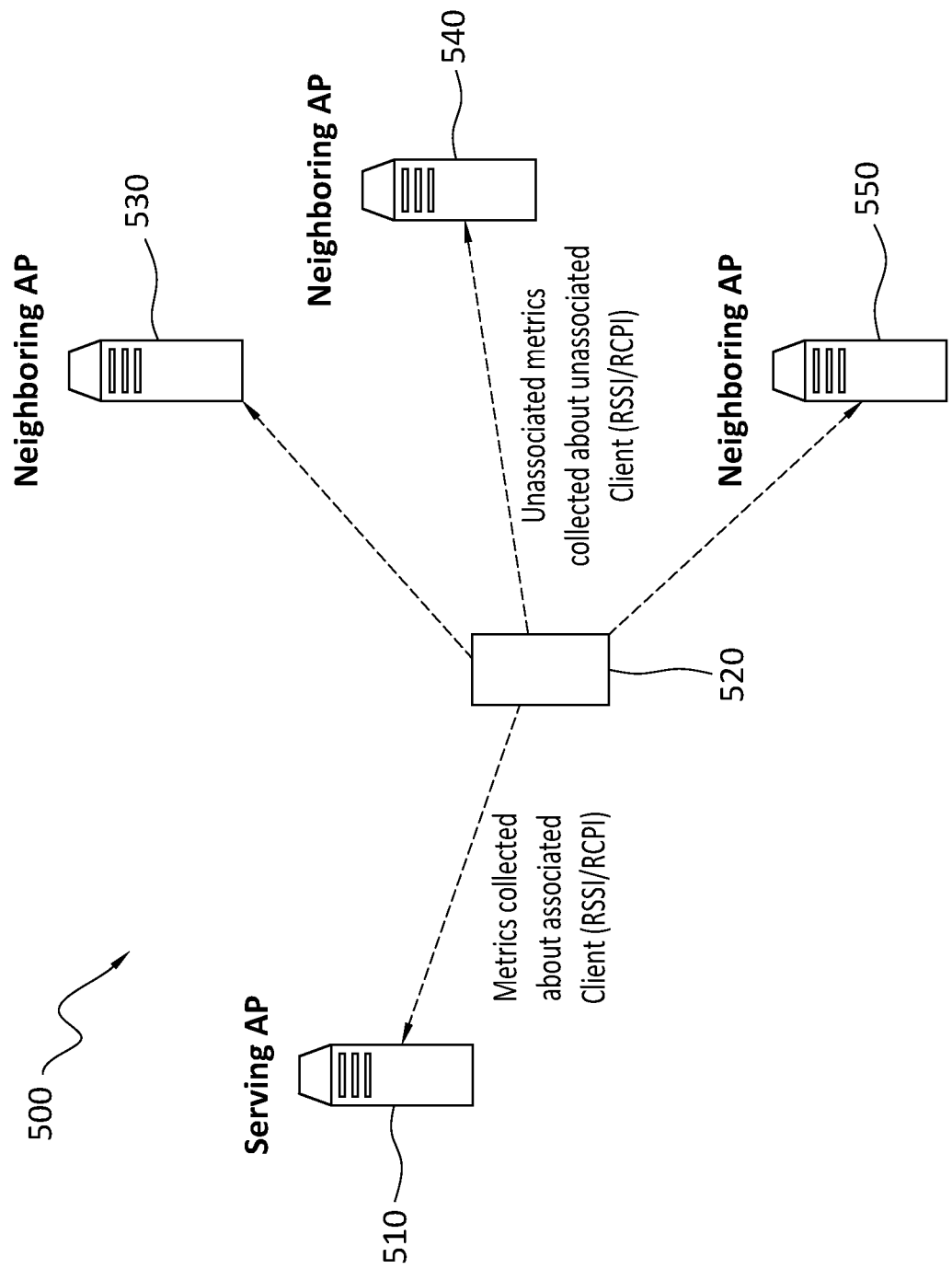
FIG. 5 shows a portion of mesh network that may be used as an example to illustrate the context of operation.

FIG. 5 shows a portion of mesh network 500 (e.g., network 101) that may be used as an example to illustrate the context of operation 470. Referring to FIG. 5, network 500 includes a serving access point 510, a client device (e.g., smart phone) 520, and three other neighboring access points 530, 540, and 550. The serving AP 510 is one that is determined to have congested radios. In operation, the client device 520 may transmit its own performance metrics to the serving AP 510. In this example scenario, the serving AP 510 is providing service to the client device and therefore may be referred to as the associated client device relative to the serving AP. The neighboring APs are not providing service to the client device prior to performance of the steering operation. In this case, the client device 520 may be referred to as an unassociated client device relative to the neighboring APs. In implementing operation 470, the edge controller 220 determines a radio of one of the neighboring APs to steer the client device 520 to, e.g., to determine a new serving AP for the client device.

In one embodiment, the edge controller 220 may determine which radio of one of the neighboring APs to become the new serving AP using the following procedure. Based on collected associated and unassociated metrics for each affected client device, determine the optimal radio(s) for the affected client device(s) based on a path cost algorithm. The associated metrics may include one or more of RSSI, Phy Rates (transmit rate/receive rate), bandwidth, number of streams, guard interval, noise floor, etc., gathered from the serving access point of the client device(s). Un-associated metrics may be gathered from the neighboring access points for the particular client device(s).

A path cost algorithm may then be implemented by the edge controller 220 to evaluate the least cost path for a client device(s) to different APs in the network 500. In one embodiment, the cloud controller may maintain a list of Non-Preferred Radios to be excluded as eligible access points for the steering operation, e.g., as candidate access points for purposes of the edge controller selecting the best target radio for steering the client device. If the selected radio of another access point is on a Non-Preferred Radios list that has been generated (e.g., by the cloud controller) based on the congestion information previously described, then the edge controller 220 may select the next least cost path until it finds a radio of another access point that is not on the Non-Preferred Radios list.

Next, the edge controller 220 may attempt to steer each client device designated for steering to the selected radio(s) using, for example, the 802.11v BTM feature (if supported by the client device(s)). Otherwise, the edge controller may attempt to steer the designated client device(s) using a Deassociation/Deauthentication message. In one embodiment, the parameters used in the 802.11v BTM feature may depend on the capabilities and behavior of the client device(s). In another embodiment, if the least cost path selected radio is on the Non-Preferred Radios list, then the client steering operation may be aborted. In another embodiment, if the edge controller determines that the client device selected by the cloud controller 210 to be steered is no longer associated to the congested radio, then the edge controller may abort the steering attempt.

Figure 6:
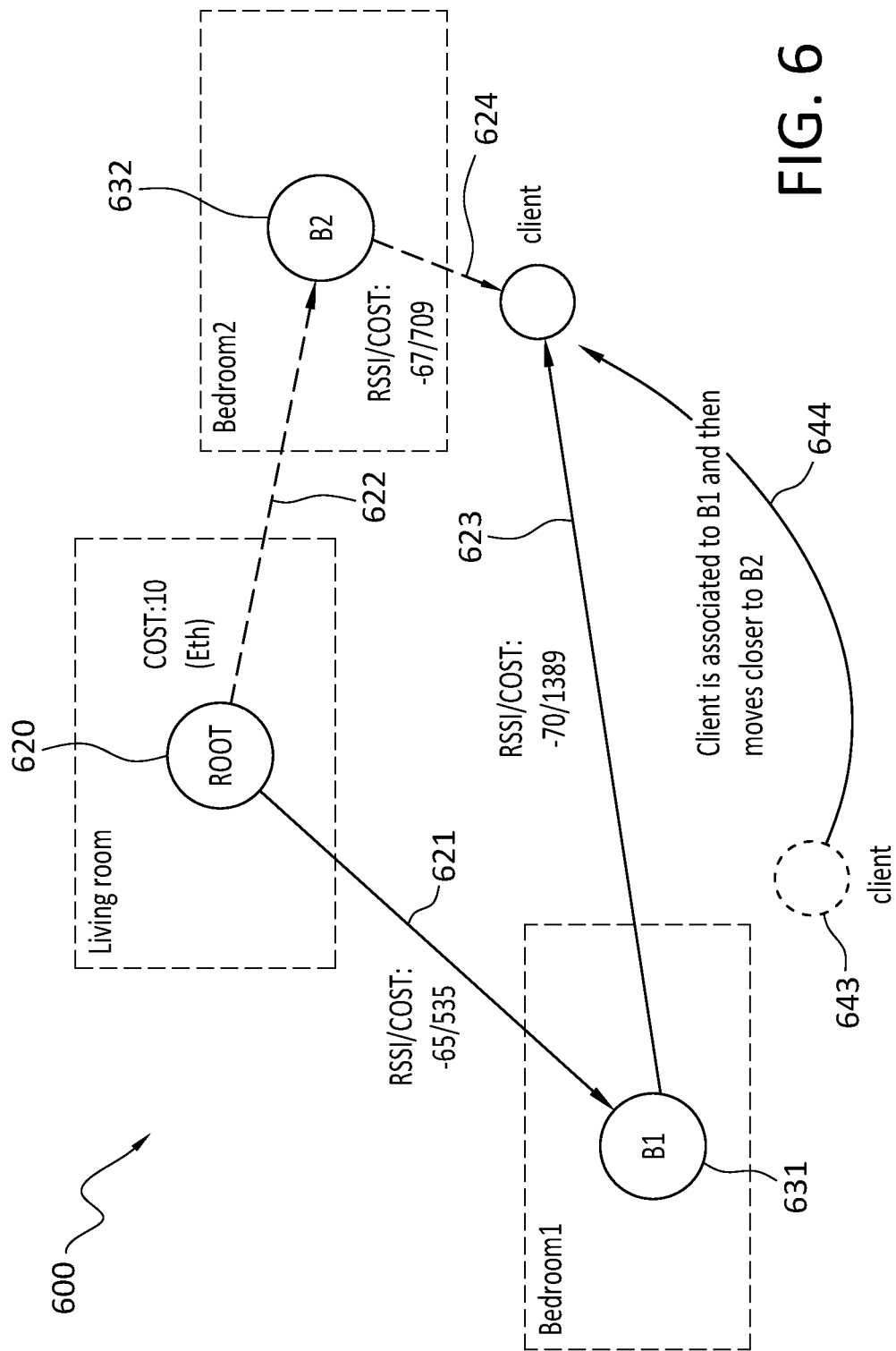
FIG. 6 illustrates a scenario of a client device moving between two different APs.

FIG. 6 illustrates a scenario of a client device moving between two different APs. The edge controller helps to manage which AP a client will connect to in a mesh network or other wireless network. Typically this is done using the RSSI. The edge controller will facilitate the client connecting to the AP that provides the strongest signal. The problem with this is that the one AP may become congested. A client connected to the congested AP or the edge controller may not be aware of this congestion, and there may be a nearby AP that has a lower but sufficient RSSI that is not congested. FIG. 6 will be used to illustrate how the cloud controller (not shown, but see 210 in FIG. 2) may determine that a client 643 may be better served by a different AP. A home network 600 may include an edge controller 620, a first AP extender 631 located in first bedroom and a second AP extender 632 located in a second bedroom. The client 643 starts at a first location and moves 644 to a second location. At the first location, the client 643 is close to the first AP 631 and because of this is associated with the first AP 631. This is initial association may be made because the RSSI between the client 643 and the first AP extender 631 is the best.

As the client 643 moves 644, the cloud controller may evaluate which AP may be the best AP for the client 643. First, the cost of the connection via the first AP extender 631 is calculated. The cost of the link 623 between the client 643 and the first AP extender is 1389. Various methods for determining the cost of the link may be calculated that include various parameters including the available bandwidth. Then the cost of the link 621 between the first AP extender 631 and the edge controller 620 is calculated as 535, which results in a path cost of 1928. Next, the path cost between the client 643 and the edge controller 620 via the second AP extender 632 using links 622 and 624 is calculated as 10+709=719. The path cost through the second AP extender 632 is much lower, so the cloud controller may initiate a steer command to the edge router 620 to steer the client 632 to the second AP extender 632. In the situation where the second AP extender is tri-band, i.e., including both a low and high 5 GHz band, the steering command may recommend of which 5 GHz bands to use.

Now an embodiment of a method for indicating non-preferred radios will be described. The cloud controller 210 will maintain a list of non-preferred radios that shall be excluded as targets for the APs in the context of selecting the best target radio for client steering. This method for indicating non-preferred radios includes the following steps. The cloud controller 210 will identify all the congested radios in the access points in the network periodically based on the latest metric parameters received from the APs and a configured congestion criteria. The cloud controller 210 will keep track of the congested radios for each managed network. Next, the cloud controller 210 will send to the edge controller 220 of the root AP a message (in one embodiment the message may be sent in a JSON format, but any format or protocol can be used) indicating the total number of congested Wi-Fi radios for a given network: hereafter referred as non-preferred radios. The edge controller 220 will consider the received non preferred radios as an exclusion list for all client steering regardless of whether the steering is initiated by cloud (as per previous embodiments) or initiated internally within network as part of RSSI based client steering by the edge controller in the following manner. When the edge controller 220 determines the path cost for the client, the edge controller 220 will exclude any APs/radios that are in the exclusion list. If all target nodes are in the exclusion list, then steering is not performed.

In another embodiment, if the least path cost radio is included in the exclusion list, then steering is aborted. In another embodiment, if the least path cost radio is included in the exclusion list, then the edge controller 220 will select the next least path cost radio that is not included in the exclusion list.

In another embodiment, the non-preferred radio list may be ordered from the most congested to the least congested, so that if all the valid targeted radios for client steering are excluded because they are on the non-preferred radio, the edge controller 220 may select a target radio by selecting a radio with the least congestion. Alternatively, the edge controller client steering algorithm can be adapted to choose next best target for client based on both load (from the ranked list) and RSSI.

In another embodiment, to avoid having to update the non-preferred radio if the radio is no longer congested, the non-preferred radio list may also include a valid time. When a valid time value is received, a timer is started. Once the timer reaches the valid time value, the associated radio is considered as no longer part of the non-preferred radio list. The valid time may be included in the message (in one embodiment the message is sent in a JSON format, but any format or protocol can be used). Further, a valid time value may be only provided for some of the radios or for all of the radios. In one embodiment, a single valid time value may apply to all radios.

Various examples of the messaging that may be used between the cloud controller and the edge controller will now be described.

First, the messaging as described above may be sent using a RESTFUL HTTP interface. One example is with a polling and polling response. Such a polling/polling response mechanism is helpful to go through a firewall. The cloud controller 210 will receive a polling message from the edge AP 220 periodically, and if a configuration change occurs, the cloud controller 210 will reply to the polling message with a polling response with a new configuration that may include in this context messaging related to the congested based band steering embodiment, the load balancing embodiment, or the non-preferred radio embodiment.

Each messaging exchange may be carried out independently from one other. For example, even if no stations were identified for congested band steering or none for load balancing, an independent messaging can be sent for the non-preferred radio list.

The following example JSON message may be used to configure an edge controller for congested based band steering (in one embodiment the message is sent in a JSON format, but any format or protocol can be used):

```
"congestionConfig": [
  {
    "cbbsEnabled": 1,
    "vap_interface": [
      {
        "apPrimMac": "81:3c:7a:1b:48:2d",
        "bssid": "81:3b:7a:1b:48:2d",
        "sta": [
          "4c:34:88:b3:cd:bf",
          "4c:34:88:b3:cd:ba",
          "4c:34:88:b3:cd:bc"
        ]
      },
      {
        "apPrimMac": "81:3c:7a:1b:4c:2d",
        "bssid": "81:3b:7a:1b:48:2f",
        "sta": [
          "5c:34:88:b3:cd:bf",
          "5c:35:88:b3:cd:bg"
        ]
      }
    ]
  }
]
```

The definition of the various JSON tags was provided above. In this example, a first network has three different congested stations and a second network has two different congested stations.

The following example JSON message may be used to configure the edge controller for load balancing:

```
"lb5gConfig": [
  {
```

```
    "lb5gEnabled": 1,
    "vap_interface": [
        {
            "apPrimMac": "81:3c:7a:1b:48:2d",
            "bssid": "81:3b:7a:1b:48:2d",
            "sta": [
                "4c:34:88:b3:cd:bf",
                "4c:34:88:b3:cd:ba",
                "4c:34:88:b3:cd:bc"
            ]
        },
        {
            "apPrimMac": "81:3c:7a:1b:4c:2d",
            "bssid": "81:3b:7a:1b:48:2f",
            "sta": [
                "5c:34:88:b3:cd:bf",
                "5c:35:88:b3:cd:bg"
            ]
        }
    ]
},
```

The definition of various JSON tags was provided above. In this example a first network has three different congested stations and a second network has two different congested stations.

The following example JSON message may be used to configure the edge controller to receive and use a non-preferred radios list:

```
"nonPreferredRadios": [
    {
        "apPrimMac": "81:3c:7a:1b:47:2d",
        "ttl": 900,
        "freqBand": [
            "2.4G",
            "5G"
        ]
    },
    {
        "apPrimMac": "81:3c:7a:1b:48:2d",
        "ttl": 900,
        "freqBand": [
            "5G"
        ]
    },
    {
        "apPrimMac": "81:3c:7a:1b:49:2d",
        "ttl": 900,
        "freqBand": [
            "5G"
        ]
    }
],
```

In this list, three different APs are listed, and the specific radio (i.e., 2.4 GHz or 5 GHz) that is non-preferred is also specified.

Because the cloud must monitor the clients associated with the managed APs, the various APs regularly send performance metrics of the associated clients. This includes the RSSI level perceived by the AP for each client. Other metrics such as the average downlink and uplink throughput, the transmission and received bitrate and so on may also be beneficial. The value of the parameter mode or Wi-Fi mode may also beneficial as it may indicate whether the client supports 5 GHz or 6 GHz or any other defined bands. An example of a JSON format of metrics associated to a client is shown below:

```
"sta_info": [
    {
        "mac_address": "7c:7a:91:c0:35:69",
        "ip_address": "10.168.2.197",
        "hostname": "",
        "dl_throughput": 704,
        "ul_throughput": 384,
        "tx_bitrate": 173,
        "rx_bitrate": 144,
        "tx_packets": 15,
        "rx_packets": 21,
        "tx_bytes": 5310,
        "rx_bytes": 2900,
        "tx_per": 0,
        "signal": -40,
        "htMode": "11AC_VHT20",
        "capBits": 0,
        "assoc_time": 2165
    }
}
```

Because the cloud must monitor the performance of each radio to assess the congestion level, information related to the radio status must also be included in the periodic metrics received by the cloud controller. An example of a JSON format of metrics associated with a radio is shown below:

```
"radio_interface": [
    {
        "interface_name": "rax0",
        "ssid": "mySSID",
        "mac_address": "02:05:9e:c8:97:67",
        "frequency": 2437,
        "tx_power": "20",
        "num_of_stas": 1,
        "tx_packets": 15,
        "rx_packets": 21,
        "dl_throughput": 704,
        "ul_throughput": 384,
        "signal": -40,
        "tx_per": 0,
        "channel_own_usage_ratio": 22,
        "rx_per": 0,
        "tx_prr": 0,
    }
}
```

The methods above are described using the 2.4 GHz band and the 5 GHz band. A new 6 GHz band has also been defined for use in Wi-Fi networks. The methods described above may also be used to steer clients to the new 6 GHz band, by preventing re-association with the 2.4 GHz band or by preventing re-association with the 5 GHz band.

A second embodiment for messaging will now be described using the User Services Platform (USP) that is described in TR-369 protocol. USP may be used to send the congestion based band steering embodiment, the load balancing embodiment, and the non preferred radio embodiment configurations from the cloud controller 210 to the edge controller 220. The configuration information may be sent using new extended configuration attributes based on USP. The following sections describe extensions to the Data Elements object in the TR-181 data model to send these configurations to AP via USP. Note some of these attributes may also be managed via TR-069.

Both congestion and load balancing based band steering requests may be sent to the edge controller via a command illustrated below. This command may be triggered per client device that needs to be steered.

| Name | Type | Write | Description |
|---|---|---|---|
| SteerRequest( ) | command | — | [ASYNC] This command requests initiation of steering to a client device to move to another BSS |
| ⇒ Input. | arguments | — | Input arguments. |
| ⇒ SteeringReason | String | W | [MANDATORY] Indicates the reason for Steering request. Enumeration of<br>Congestion In Current Band<br>Load Balancing<br>When this is set as "Congestion In Current Band" then steering logic can try moving the client to any band in the Mesh network<br>When this is set as "Load Balancing" then steering logic should try moving the client to another BSS in the current band |
| ⇐ Output. | arguments | — | Output arguments. |
| ⇐ Status | string | — | Indicates the response to the Steering request. Enumeration of:<br>Success -> On successful execution of the command<br>Error_Not_Ready -> Underlying SW not available<br>Error_Invalid_Input -> Input argument is not matching with given possible values<br>Error_Timeout -> Response not received<br>Error_Interface_Down -> If Current BSS is down<br>Error_Other (OPTIONAL) -> Other implementation specific error scenario |

This command may be added in the below path in TR-181: 2-15 USP Data model:
Device.Wi-Fi.DataElements.Network.Device.{i}.Radio.{i}.BSS.{i}.STA.{i}.MultiAPSTA.

The details of these objects in the path may be found in TR181:2-15 USP Data model.

This is an asynchronous [ASYNC] command, and the status of this command is sent back to the cloud controller if it is interested in knowing the status. This feedback may be performed only if the cloud controller subscribes for the operation complete event for this command: refer to the TR-181-2:15 data model for event subscription defined in Device.LocalAgent.Subscription.{i}.

This command takes one argument "SteeringReason" and it is a mandatory argument. When the cloud controller triggers this steering command due to congestion based band steering then it sets the "SteeringReason" as "Congestion In Current Band". Similarly the cloud controller sets the "SteeringReason" as "Load Balancing" when it triggers the command due to load balancing. On receiving this command the edge controller performs an action based on the value in the "SteeringReason". For "Congestion In Current Band", the edge controller identifies the best BSS on any available Wi-Fi band in the mesh network and based on client capability, and the edge controller either triggers 802.11v signaling or performs steering via Deassociation/Deauthentication and/or black listing the client in the current band. For "Load Balancing", the edge controller identifies the best BSS in the band same as the current operating band of the client device and triggers the steering operation for the client device. Failure while triggering the steering command to the client device is reported via a command output variable status. All possible command failure values are shown in the above table.

Below is an example of the steering command sent from the cloud controller to the edge controller as an USP OPERATE message to steer client device with MAC address xx:yy:aa:dd:bb:cc:

```
header {
    msg_id: "<msg_id>"
    msg_type: OPERATE
}
body {
    request {
        operate {
            command: "Device.Wi-Fi.DataElements.Network.Device.1.Radio.1.BSS.1.STA.
                { MACAddress == "xx:yy:aa:dd:bb:cc"}.MultiAPSTA. SteerRequest( )"
            command_key: "steer_cbbs"
            send_resp: false
            input_args {
                "SteeringReason":"Congestion In Current Band"
            }
        }
    }
}
```

Band steering statistics that result from the steering operation may be captured in TR-181-2:15 USP data model in the below path:

Device.Wi-Fi.DataElements.Network.Device.{i}.Radio.{i}.BSS.{i}.STA.{i}.MultiAPSTA. SteeringSummaryStats.

Below are the attributes added to the existing objects. The edge controller is expected to increment the below counters based on the success state of the steering operation performed for a client device.

| Name | Type | Write | Description |
| --- | --- | --- | --- |
| CongestionSteeringAttempts | unsignedLong | — | [StatsCounter64] Number of times steer was attempted on this Associated Device due to congestion detected on current band |
| CongestionSteeringSuccesses | unsignedLong | — | [StatsCounter64] Number of times congestion triggered steer succeeded for this Associated Device. |
| CongestionSteeringFailures | unsignedLong | — | [StatsCounter64] Number of times congestion triggered steer failed for this Associated Device |
| LBSteeringAttempts | unsignedLong | — | [StatsCounter64] Number of times steer was attempted on this Associated Device due to over load detected on current band |
| LBSteeringSuccesses | unsignedLong | — | [StatsCounter64] Number of times Load triggered steer succeeded for this Associated Device. |
| LBSteeringFailures | unsignedLong | — | [StatsCounter64] Number of times Load triggered steer failed for this Associated Device |

These steering operations are also logged into steering history maintained for corresponding client device in the below path:
Device.Wi-Fi.DataElements.Network.Device.{i}.Radio.{i}.BSS.{i}.STA.{i}.MultiAPSTA.SteeringHistory.{i}.
Refer to the TR-181-2:15 USP Data model for the complete content of steering history.

The following TriggerEvent attribute may also be added to the existing objects.

| Name | Type | Write | Description |
| --- | --- | --- | --- |
| TriggerEvent | string | — | The type of event that caused the steering to be initiated.<br>Below two new values are added to this attribute.<br>Congestion In Current Band<br>Load Balancing |

Setting TriggerEvent to "Congestion In Current Band" for an entry in the SteeringHistory indicates that the corresponding steering operation was triggered due to congestion detection. Similarly a steering request triggered due to "Load Balancing" will have TriggerEvent set to "Load Balancing".

A non-preferred radio configuration message may be sent to the edge controller using the below attribute that is added per radio to indicate the congestion status of a radio.

| Name | Type | Write | Description |
| --- | --- | --- | --- |
| isCongested | Boolean | W | True indicates corresponding radio is congested, false indicates the radio is not congested |

This attribute may be added in the below path in the data model:
Device.Wi-Fi.DataElements.Network.Device.{i}.Radio.{i}.

Once the cloud controller detects that a particular radio is congested, i.e., the current congestion level is greater than configured congestionThreshold, the cloud controller sets the isCongested attribute in the corresponding radio object to true. Similarly when the congestion level is reduced below the configured congestionThreshold, the cloud controller sets the isCongested to false. When the edge controller receives a configuration of setting isCongested set to true for a radio, then the edge controller adds all the BSS's associated with the corresponding radio to the non-preferred radio list and avoids steering client devices to these BSS's. Similarly when isCongested is set to false then all BSS's associated with the corresponding radio are removed from the non-preferred radio list and these BSS's may be considered while steering clients.

Below is an example of setting isCongested attribute to true for a radio from the cloud controller to the edge controller in an USP SET message:

```
header {
  msg_id: "<msg_id>"
  msg_type: SET
}
body {
  request {
    set {
      allow_partial: false
      update_objs {
        obj_path: "Device.Wi-Fi.DataElements.Network.Device.1.Radio.1."
        param_settings {
          param: "isCongested"
          value: "true"
          required: true
        }
      }
    }
  }
}
```

As alternative implementation option, the cloud controller may set the valid time value for the congestion evaluation performed by the cloud controller for a specific radio. The valid time for a radio starts once the cloud controller sets isCongested to true for the corresponding radio. After the valid time, the edge controller may itself remove the radio from the non-preferred radio list. This congestion valid time may be added in the below data model path:
Device.Wi-Fi.DataElements.Network.

Below is the attribute to set this validity time:

| Name | Type | Write | Description |
| --- | --- | --- | --- |
| Congestionvalid timeTime | unsignedInt | — | Number of seconds the congestion evaluation is valid, after which AP by itself can consider the Radio is not congested |

In another scenario, the edge controller might not have the capability to decide the best target radio the client should be steered to. In this case, the cloud controller may provide one or more target radios to be steered to. This covers a scenario when the edge controller is an AP that does not control the operation of other APs in the network.

In one embodiment, the cloud controller provides each AP (serving AP) a list of preferred steering radios that they should be steering to based on the relative proximity of the serving AP with the other neighbor APs. The congestion level may also be considered in selecting the list of preferred steering radios. An 802.11v command to clients may support up to three BSSID's, and accordingly it is possible to have a list of up to three preferred steering radios. When more than 1 target BSSID is provided to the clients, the client may select the best BSSID based on its own criteria. When the client does not support 802.11v, then Deassociation/Deauthentication is used the steer the client away from the congested radio.

Figure 7:
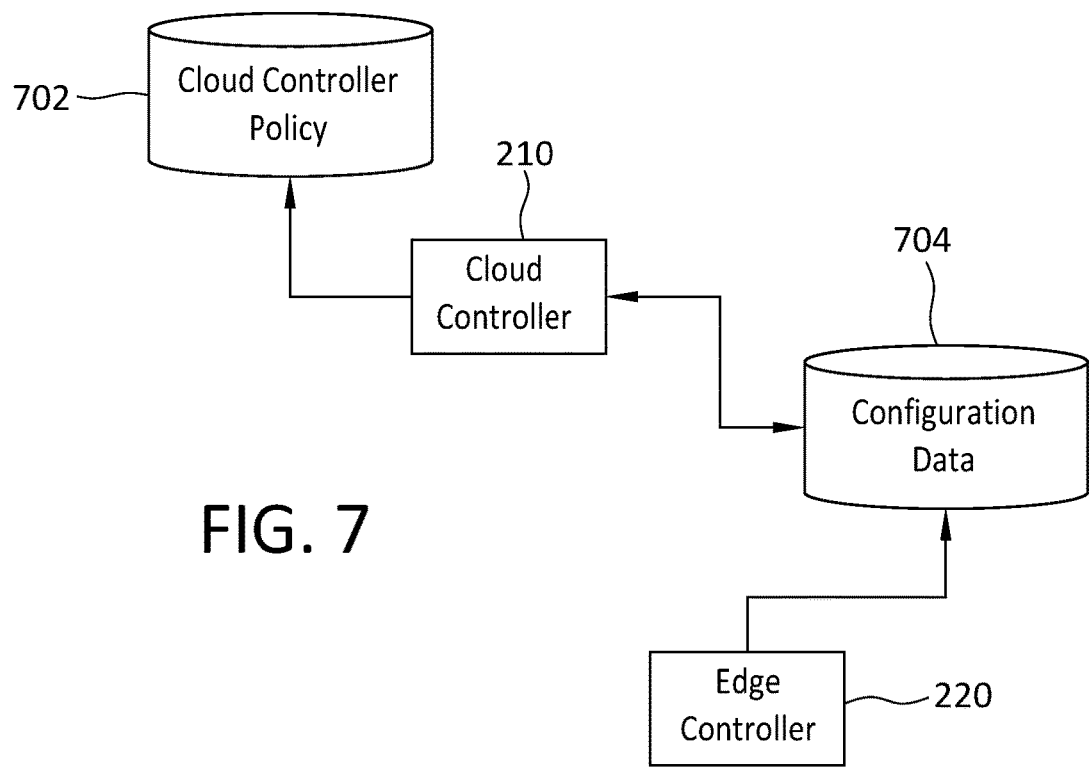
FIG. 7 illustrates how the cloud controller may implement various policies based upon a policy storage.

FIG. 7 illustrates how the cloud controller may implement various policies based upon a policy storage. A cloud controller policy storage 702 may store various policies regarding the operation of deployed networks. A configuration data storage 704 may store configuration and other date related to the deployed network. The data stored in the configuration data storage 704 may come directly from the edge controller or other APs in the deployed network. Alternatively, all the data may first go to the cloud controller 210, and the cloud controller 210 stores the data in the configuration data storage 704. The cloud controller 210 may determine that there is congestion in the deployed network. Then the cloud controller 210 may then determine a specific could policy to use from the could controller policy storage 702. This determination may be based upon the data stored in the configuration data storage 704. The selected policy could adjust various parameters, including for example, the overall congestion level threshold, the own channel usage threshold, or the number of associated devices that triggers the congestion steering logic. Further the congestion based steering and load balancing embodiments may also be enabled/disabled independently based on the cloud policy. Various methods may be used to set the cloud policy. For example, the policy may be set by network administrators or based upon analysis of data collected over time.

The embodiments described herein provide a variety of benefits in managing locally deployed networks, such as for example, mesh Wi-Fi networks. An interface between the cloud controller and the edge controller is introduced that provides command and control of channel management, load balancing through steering clients, and congestion based band steering of clients. The client steering is based on channel load and congestion metrics and initiated by the cloud controller and executed by the edge controller. Also client steering may include the cloud controller indicating to the edge controller which clients should be steered away from a certain radio so that the edge controller determines the optimum radio to steer the client to given the non-preferred radio list sent by the cloud controller. Further, client steering may be implemented where the cloud controller determines the non-preferred radio list based on a number of factors including channel load and congestion level, and the cloud controller sends this non-preferred radio list to the edge controller whenever a new congestion or channel load event is detected.

The embodiments described herein provide a co-operative framework between the cloud controller and an edge controller in order to optimize the use of radio resources.

Embodiments where also described where parameters are introduced into the USP and TR-181 standards to facilitate the interaction between the cloud controller and edge controller with regards to client steering of clients from congested or loaded radios.

Figure 8:
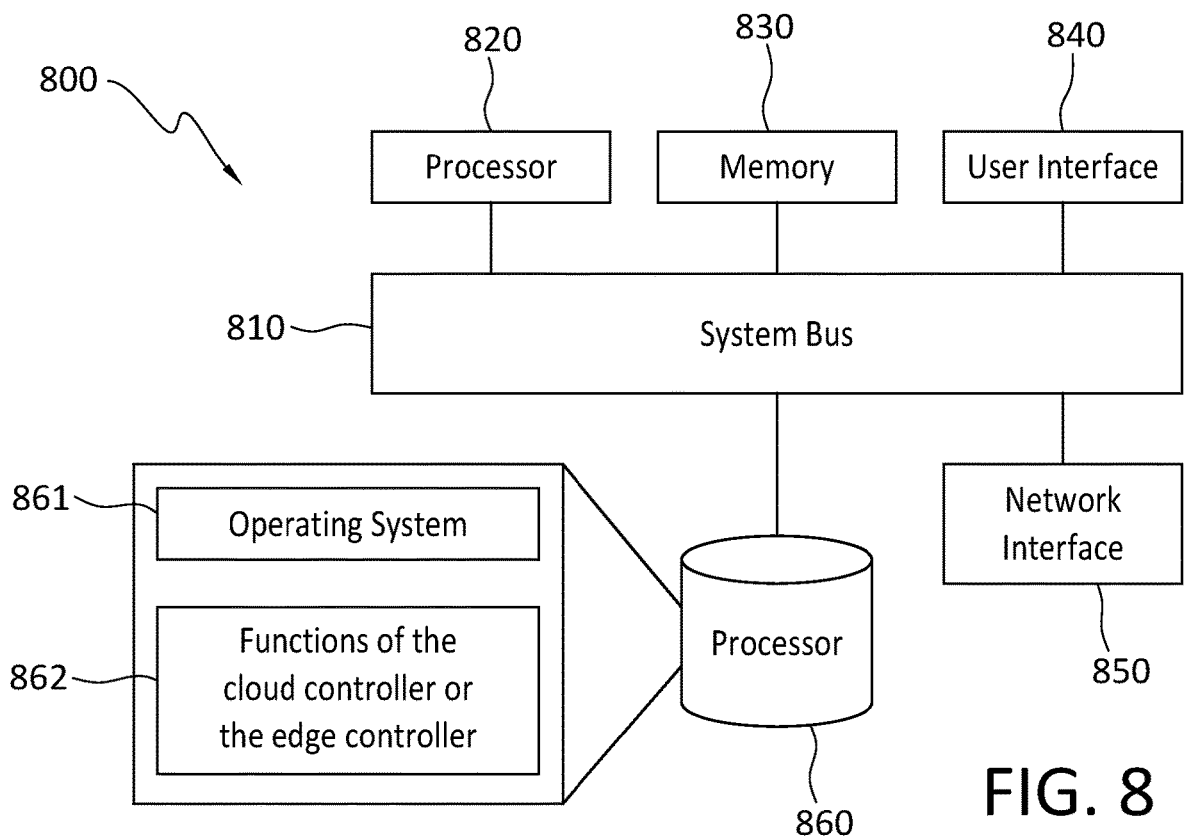
FIG. 8 illustrates an exemplary hardware diagram for implementing the cloud controller or the edge controller.

FIG. 8 illustrates an exemplary hardware diagram 800 for implementing the cloud controller or the edge controller. The exemplary hardware 800 may be the first controller 110 or second controller 120 of FIG. 1 or the cloud controller 210 or edge controller 220 of FIG. 2. As shown, the device 800 includes a processor 820, memory 830, user interface 840, network interface 850, and storage 860 interconnected via one or more system buses 810. It will be understood that FIG. 8 constitutes, in some respects, an abstraction and that the actual organization of the components of the device 800 may be more complex than illustrated.

The processor 820 may be any hardware device capable of executing instructions stored in memory 830 or storage 860 or otherwise processing data. As such, the processor may include a microprocessor, microcontroller, graphics processing unit (GPU), neural network processor, field programmable gate array (FPGA), application-specific integrated circuit (ASIC), or other similar devices.

The memory 830 may include various memories such as, for example L1, L2, or L3 cache or system memory. As such, the memory 830 may include static random-access memory (SRAM), dynamic RAM (DRAM), flash memory, read only memory (ROM), or other similar memory devices.

The user interface 840 may include one or more devices for enabling communication with a user such as an administrator. For example, the user interface 840 may include a display, a touch interface, a mouse, and/or a keyboard for receiving user commands. In some embodiments, the user interface 840 may include a command line interface or graphical user interface that may be presented to a remote terminal via the network interface 850.

The network interface 850 may include one or more devices for enabling communication with other hardware devices. For example, the network interface 850 may include a network interface card (NIC) configured to communicate according to the Ethernet protocol or other communications protocols, including wireless protocols. Additionally, the network interface 850 may implement a TCP/IP stack for communication according to the TCP/IP protocols. Various alternative or additional hardware or configurations for the network interface 850 will be apparent.

The storage 860 may include one or more machine-readable storage media such as read-only memory (ROM), random-access memory (RAM), magnetic disk storage media, optical storage media, flash-memory devices, or similar storage media. In various embodiments, the storage 860 may store instructions for execution by the processor 820 or data upon with the processor 820 may operate. For example, the storage 860 may store a base operating system 861 for controlling various basic operations of the hardware 800. Further, the storage may include instructions 862 for carrying out the functions of the cloud controller or edge controller as described above.

It will be apparent that various information described as stored in the storage 860 may be additionally or alternatively stored in the memory 830. In this respect, the memory 830 may also be considered to constitute a "storage device" and the storage 860 may be considered a "memory." Various other arrangements will be apparent. Further, the memory 830 and storage 860 may both be considered to be "non-transitory machine-readable media." As used herein, the term "non-transitory" will be understood to exclude transitory signals but to include all forms of storage, including both volatile and non-volatile memories.

The system bus 810 allows communication between the processor 820, memory 830, user interface 840, storage 860, and network interface 850.

While the host device 800 is shown as including one of each described component, the various components may be duplicated in various embodiments. For example, the processor 820 may include multiple microprocessors that are configured to independently execute the methods described herein or are configured to perform steps or subroutines of the methods described herein such that the multiple processors cooperate to achieve the functionality described herein. Further, where the device 800 is implemented in a cloud computing system, the various hardware components may belong to separate physical systems. For example, the processor 820 may include a first processor in a first server and a second processor in a second server.

In accordance with one or more of the aforementioned embodiments, the methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the operations of the system and method embodiments described herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Although the various exemplary embodiments have been described in detail with particular reference to certain exemplary aspects thereof, it should be understood that the invention is capable of other example embodiments and its details are capable of modifications in various obvious respects. As is apparent to those skilled in the art, variations and modifications can be affected while remaining within the spirit and scope of the invention. The embodiments may be combined to form additional embodiments. Accordingly, the foregoing disclosure, description, and figures are for illustrative purposes only and do not in any way limit the invention, which is defined by the claims. The embodiments may be combined to form additional embodiments.

We claim:

1. A cloud controller configured to control a wireless network having a plurality of access points controlled by an edge controller, the cloud controller comprising:
   a network interface configured to communicate with the wireless network;
   a memory; and
   a processor coupled to the memory and the network interface, wherein the processor is further configured to:
      receive performance metrics for the wireless network including congestion information;
      compare the congestion information with congestion criteria;
      identify clients connected to the wireless network as candidates to be transferred to another access point in the wireless network;
      send a steering command to the edge controller with a list of identified clients to steer based on the identified clients; and
      receive an indication of clients steered by the edge controller,
   wherein identifying clients connected to the wireless network as candidates to be transferred further is based upon at least one of:
      the clients being dual band capable;
      steering attempt success rate;
      a ranking of clients current usage throughput rates; and
      a limit on the number of clients that may be steered using one steering command.

2. The cloud controller of claim 1, wherein the steering command includes load balancing between access points in the wireless network.

3. The cloud controller of claim 1, further comprising monitoring congestion among radios in access points associated with the edge controller of the wireless network in a same frequency band and wherein the steering command includes load balancing between access points in the wireless network.

4. The cloud controller of claim 1, wherein the steering command includes steering between a first radio using a first frequency band and a second radio using a second frequency band when there is congestion in the first frequency band.

5. The cloud controller of claim 1, wherein the steering command includes a non-preferred radio list.

6. The cloud controller of claim 5, wherein the non-preferred radio list is ordered based upon a congestion level.

7. The cloud controller of claim 5, wherein the non-preferred radio list includes a time to live indication.

8. The cloud controller of claim 1, wherein the congestion criteria include one of an overall congestion level of a radio in an access point, an own channel usage of a radio in an access point, and a number of associated devices.

9. The cloud controller of claim 1, wherein the steering command is sent to the edge controller using one of a RESTFULL HTTP interface and a Message queuing Telemetry Transport (MQTT) interface.

10. The cloud controller of claim 1, wherein the steering command is sent to the edge controller using extensions to the User Services Platform (USP) data model.

11. An edge controller configured to control a wireless network having a plurality of access points having a radio based upon steering commands from a cloud controller, comprising:
   a network interface configured to communicate with the cloud controller;
   a memory; and a processor coupled to the memory and the network interface, wherein the processor is further configured to:
    receive a steering command from the cloud controller with a list of identified clients to steer to another access point in the wireless network;
    determine for each identified client to steer a different radio in an access point;
    send a client steering command to each of the clients, wherein the steering command includes a non-preferred radio list and wherein the non-preferred radio list includes a valid time value associated with at least one radio in the non-preferred radio list and wherein the processor is configured to remove the radio associated with the valid time value from the non-preferred radio list when the valid time expires; and
    send, to the cloud controller, an indication of clients steered by the edge controller.

12. The edge controller of claim 11, wherein the processor is further configured to transmit performance metrics for the wireless network including congestion information to the cloud controller.

13. The edge controller of claim 11, wherein the steering command includes load balancing between access points in the wireless network.

14. The edge controller of claim 11, wherein the steering command includes steering between a first radio using a first frequency band and a second radio using a second frequency band when there is congestion in the first frequency band.

15. The edge controller of claim 11, wherein the non-preferred radio list is ordered based upon a congestion level.

16. The edge controller of claim 11, wherein determining for each identified client to steer a different radio includes determining optimal different radios for each identified client based upon a path cost algorithm.

17. The edge controller of claim 16, wherein the new radio is a radio with a lowest path cost.

18. The edge controller of claim 16, wherein the new radio is a radio with a lowest path cost not on a non-preferred radio list.

19. The edge controller of claim 11, wherein the steering command is sent to the edge controller using one of a RESTFULL HTTP interface and a Message queuing Telemetry Transport (MQTT) interface.

20. The edge controller of claim 11, wherein the steering command is sent to the edge controller using extensions to the User Services Platform (USP) data model.

21. A method of controlling an edge controller configured to control a wireless network having a plurality of access points having a radio based upon steering commands from a cloud controller, comprising:
    receiving a steering command from the cloud controller with a list of identified clients to steer to another access point in the wireless network;
    determining for each identified client to steer a different radio in an access point;
    sending a client steering command to each of the clients, wherein the steering command includes a non-preferred radio list and wherein the non-preferred radio list includes a valid time value associated with at least one radio in the non-preferred radio list and wherein the processor is configured to remove the radio associated with the valid time value from the non-preferred radio list when the valid time expires; and
    sending, to the cloud controller, an indication of clients steered by the edge controller.

\* \* \* \* \*